(12) United States Patent
Tolley

(10) Patent No.: US 7,206,772 B2
(45) Date of Patent: Apr. 17, 2007

(54) METHOD OF OPERATING A PLANT AND A CONTROL SYSTEM FOR CONTROLLING THE SAME

(75) Inventor: H. Dennis Tolley, Mapelton, UT (US)

(73) Assignee: GBI Structures, L.L.C., Springville, UT (US)

( * ) Notice: Subject to any disclaimer, the term of this patent is extended or adjusted under 35 U.S.C. 154(b) by 492 days.

(21) Appl. No.: 10/280,693

(22) Filed: Oct. 25, 2002

(65) Prior Publication Data

US 2004/0083013 A1    Apr. 29, 2004

(51) Int. Cl.
*G06F 17/00* (2006.01)
*G06K 9/00* (2006.01)
*G06F 9/44* (2006.01)

(52) U.S. Cl. .................. 706/46; 382/159; 382/173; 382/169; 382/155; 706/16; 706/25

(58) Field of Classification Search ............ 706/46, 706/25, 16; 382/159, 173, 190
See application file for complete search history.

(56) References Cited

U.S. PATENT DOCUMENTS

| | | | | |
|---|---|---|---|---|
| 5,133,046 | A * | 7/1992 | Kaplan | 706/52 |
| 6,405,200 | B1 * | 6/2002 | Heckerman | 707/6 |
| 6,529,895 | B2 * | 3/2003 | Heckerman | 707/2 |

OTHER PUBLICATIONS (2002). American Heritage College Dictionary. Boston:Houghton Millan Company, pp. 495 & 725.*
(1992). Numerical Recipes In C: The Art of Scientific Computing. Cambridge University Press, p. 105.*
(2002). American Heritage College Dictionary. Boston: Houghton Millan Company, pp. 495 & 725.*
(1992). Numerical Recipes In C: The Art of Scientific Computing. Cambridge University Press, p. 105.*
Kaplan S. ; Frank V.M.; Bley C.D. ; Lindsay G.D. (1988). Outline of COPILOT, an Expert System for Reactor Operation Assistance, Using a Bayesian Diagnostic Module, Reliability Engineering and System Safety. Elsevier Applied Science Publishers: Great Britain, pp. 411-435.*

\* cited by examiner

*Primary Examiner*—Leo Picard
*Assistant Examiner*—Sunray Chang
(74) *Attorney, Agent, or Firm*—Blaney Harper; Jones Day

(57) ABSTRACT

A novel apparatus and method for controlling a system with multiple observable variables is disclosed. The apparatus and method disclosed use elements of the bottom-up and top-down strategies of artificial intelligence to provide a control system that is able to learn without a training set of information, and that has an learning process that can handle any amount of input data, i.e., cannot become saturated. The control system disclosed is capable of learning and controlling non linear dynamical systems. The control system is also capable of adding additional observable variables or subtracting existing observable variables to determine the state of the plant or system being controlled.

21 Claims, 6 Drawing Sheets

| | INPUT SPORE.SHAPE | INPUT SPORE.COLOR | INPUT SEASON | INPUT CLUSTERS | INPUT HABITAT | INPUT RANGE | STATE VAR 1 CAUTION | STATE VAR 2 CHOICE | STATE VAR 3 DEADLY | STATE VAR 4 GOOD | STATE VAR 5 POISON | DATA STATE | DYNAMICAL STATE |
|---|---|---|---|---|---|---|---|---|---|---|---|---|---|
| 1 | ELLIPTICAL | PURPLE | SEP | <NA> | MIXED_WOODS | CANADA | 2.33E-16 | 9.76E-01 | 4.37E-12 | 7.11E-22 | 2.36E-02 | 2 | 2 |
| 2 | ELLIPTICAL | WHITE | SEP | SOLITARY | URBAN | CANADA | 8.86E-01 | 9.29E-02 | 5.31E-32 | 3.74E-12 | 2.15E-02 | 1 | 1 |
| 3 | OVAL | WHITE | SEP | SCATTERED | MEADOWS | NORTH-WEST | 9.42E-01 | 1.05E-06 | 2.67E-58 | 5.25E-38 | 5.85E-02 | | 1 |
| 4 | ELLIPTICAL | PURPLE | AUG | <NA> | MIXED_WOODS | CANADA | 3.60E-31 | 1.00E+00 | 3.23E-66 | 1.33E-18 | 3.94E-20 | 1 | 1 |
| 5 | ELLIPTICAL | WHITE | JAN | <NA> | DECIDUOUS_WOODS | SOUTH-WEST | 8.57E-82 | 1.14E-94 | 1.00E+00 | 2.04E-69 | 1.98E-96 | 2 | 2 |
| 6 | ELLIPTICAL | PURPLE | AUG | SOLITARY | MIXED_WOODS | CANADA | 4.68E-01 | 4.03E-01 | 1.29E-01 | 2.86E-18 | 1.14E-09 | 3 | 3 |
| 7 | OVAL | BROWN | SEP | SOLITARY | MEADOWS | NORTH-WEST | 1.63E-09 | 5.25E-09 | 7.17E-41 | 9.52E-63 | 1.00E+00 | 1 | 1 |
| 8 | ELLIPTICAL | BROWN | SEP | SOLITARY | CONIFEROUS_WOODS | NORTH-WEST | 1.00E+00 | 3.20E-28 | 8.54E-51 | 1.08E-47 | 1.49E-29 | 5 | 5 |
| 9 | ELLIPTICAL | BROWN | AUG | SCATTERED | DECIDUOUS_WOODS | NORTH-EAST | 3.77E-01 | 7.70E-02 | 3.85E-01 | 3.92E-02 | 1.22E-01 NA | 1 | 1 |
| 10 | ELLIPTICAL | BROWN | SEP | SOLITARY | CONIFEROUS_WOODS | NORTH-WEST | 1.00E+00 | 2.48E-29 | 6.10E-48 | 4.90E-45 | 1.39E-29 | | 3 |
| 11 | ELLIPTICAL | PURPLE | AUG | SOLITARY | MIXED_WOODS | MID-WEST | 5.59E-01 | 1.88E-01 | 1.58E-03 | 7.88E-23 | 2.52E-01 | 1 | 1 |
| 12 | ELLIPTICAL | BROWN | SEP | SOLITARY | CONIFEROUS_WOODS | NORTH-WEST | 1.00E+00 | 5.53E-27 | 3.26E-78 | 1.37E-48 | 3.92E-26 | 1 | 1 |
| 13 | ELLIPTICAL | WHITE | AUG | SOLITARY | MIXED_WOODS | NORTH-EAST | 2.80E-04 | 3.44E-01 | 2.54E-38 | 6.56E-01 | 1.35E-12 NA | | 4 |
| 14 | ELLIPTICAL | PURPLE | JUL | SOLITARY | MEADOWS | CANADA | 6.33E-44 | 1.00E+00 | 1.28E-78 | 6.50E-37 | 4.66E-24 | 2 | 2 |
| 15 | ELLIPTICAL | WHITE | OCT | <NA> | MIXED_WOODS | NORTH-WEST | 1.00E+00 | 3.99E-34 | 5.92E-65 | 3.14E-14 | 1.23E-06 | 1 | 1 |
| 16 | ROUND | PURPLE | MAY | SOLITARY | URBAN | SOUTH-EAST | 2.58E-16 | 1.00E+00 | 1.55E-31 | 3.75E-67 | 2.93E-23 | 2 | 2 |
| 17 | ELLIPTICAL | GREEN | AUG | FAIRY_RING | MEADOWS | NORTH-EAST | 7.62E-34 | 1.60E-08 | 4.22E-36 | 5.14E-04 | 9.99E-01 | 5 | 5 |
| 18 | ELLIPTICAL | WHITE | FEB | <NA> | DECIDUOUS_WOODS | SOUTH-WEST | 8.58E-82 | 1.15E-94 | 1.00E+00 | 2.05E-69 | 1.98E-96 | 3 | 3 |
| 19 | ELLIPTICAL | WHITE | OCT | <NA> | DECIDUOUS_WOODS | NORTH-WEST | 8.35E-01 | 1.65E-01 | 6.29E-28 | 1.57E-05 | 1.30E-05 NA | | 1 |
| 20 | ELLIPTICAL | PURPLE | OCT | SCATTERED | URBAN | NORTH-WEST | 2.79E-39 | 1.48E-17 | 1.24E-46 | 1.46E-13 | 1.00E+00 | 5 | 5 |

THIS TABLE CONTAINS A SUBSET OF DATA ON MUSHROOMS. A PARTIAL LISTING OF THE INPUT VARIABLES IS LISTED. (THERE WERE 30 INPUT VARIABLES IN TOTAL) THE STATE VARIABLE ALGORITHM OF THE INVENTION DETERMINED THE FIVE STATE VARIABLES LISTED. THE NUMBERS BELOW THESE ARE THE GIK VALUES IN THE TEXT. THE DYNAMICAL STATE IS DETERMINED FROM THESE GIK VALUES AS ILLUSTRATED IN TEXT. THE DATA STATE WAS THE STATE DETERMINED BY INDEPENDENT OBSERVATION FROM BIOLOGICAL EXAMINATION.

FIG. 4

| | LOSS FOR DIFFERENT ACTIONS | | | | | | NEXT STATE PROBABILITIES | | | | | |
|---|---|---|---|---|---|---|---|---|---|---|---|---|
| | A FORWARD | DODGE R | DODGE L | MOVE FORE | MOVE AWAY | PAUSE | STATE 1 | STATE 2 | STATE 3 | STATE 4 | STATE 5 | STATE 6 |
| STATE 1 | -4 | 0.5 | 0.5 | 4 | 5 | 7 | 40 | 25 | 5 | 12 | 12 | 6 |
| STATE 2 | -3 | 1 | 1 | 5 | 4 | 4.5 | 20 | 20 | 20 | 15 | 15 | 10 |
| STATE 3 | -2 | 0.5 | 0.5 | 4 | 3 | 3 | 10 | 40 | 10 | 15 | 15 | 10 |
| STATE 4 | -2 | 4 | 0 | 2 | 2 | 3 | 12 | 14 | 14 | 30 | 5 | 25 |
| STATE 5 | -2 | 0 | 4 | 2 | 2 | 3 | 12 | 14 | 14 | 5 | 30 | 25 |
| STATE 6 | 0 | 0.5 | 0.5 | 1 | 1 | 1 | 6 | 7 | 7 | 25 | 25 | 30 |

NOTE: A NEGATIVE LOSS IS A GAIN.

STATE DESCRIPTIONS

STATE 1    VISIBLE AND CLOSE
STATE 2    VISIBLE AND MEDIUM
STATE 3    VISIBLE AND FAR
STATE 4    PARTLY VISIBLE RIGHT
STATE 5    PARTLY VISIBLE LEFT
STATE 6    NOT VISIBLE

TABLE DESCRIPTION. THIS IS A VERY SIMPLE LOSS AND TRANSITION TABLE WHERE LOSS IS EXPLICITLY DEFINED RATHER THAN BEING A IMPLICIT PART OF A RICCATI EQUATION SOLUTION. THE CONTROLLER IS TO ADJUSTING TO A MOVING TARGET BASED ON STATES. THE STATES ARE BASED ON A VECTOR OF INPUT VARIABLES. DESCRIPTIONS ARE SIMPLE CHARACTERIZATIONS. A TRANSITION PROBALITIES ARE QUOTED AS PERCENTAGES. THE ROW INDICATES ORIGINATING STATE AND COLUMN INDICATES FINAL STATE OF A SINGLE TRANSITION.

*FIG. 6*

METHOD OF OPERATING A PLANT AND A CONTROL SYSTEM FOR CONTROLLING THE SAME

TECHNICAL FIELD

This invention relates to a control system and more particularly, to a continuously learning artificial intelligent control system.

BACKGROUND

With the constant technological improvements in computer hardware and software, so has the popularity and use of artificial intelligence (AI) advanced. Although it is difficult succinctly to define AI, it generally involves attempting to create machines that behave like humans. There are two main approaches in creating such machines: bottom-up and top-down.

The bottom-up approach includes building electronic replicas of the human brain's complex network of neurons. The human brain comprises billions of cells called neurons, and when they are grouped together in a network, neurons are able to pass electrical signals to one another. In fact, it is believed that neurons may be able to process binary numbers (e.g., 0 or 1). Binary numbers are also the basis of an electronic computer. Thus, scientists created electronic replicas of neural networks to demonstrate how electronic networks could produce logical processes. In other words, a neural network attempts to imitate the operation of the human brain by creating connections between processing elements, which are the computerized equivalent to neurons.

Neural networks are effective for predicting events when the networks have a large database of prior examples to draw on. However, there are certain inherent disadvantages to using a neural network. For example, the neural network requires a knowledge base that can be used as a training set of examples. Thus, when such previous examples are unavailable, a neural network is ineffective.

Assuming a training set of examples is available, once the neural network recognizes and learns the patterns (i.e., dynamics) of the system (i.e., plant), the learning substantially stops. In other words, neural networks are generally system specific and based upon Boolean logic (i.e., the collection of AND, OR, NOT operands to produce True/False or Yes/No results). Moreover, True/False answer to the logical Boolean operations create the connections between processing elements. Therefore, once the training set of examples is developed, the neural network is substantially developed for that particular application.

However, adding fuzzy logic to a neural network may allow for further, yet limited, learning. As discussed above, conventional Boolean logic produces completely (i.e., discrete) True or False responses. Fuzzy logic, which also utilizes Boolean logic, produces a non-discrete or fuzzy response. In other words, fuzzy logic is a multi-valued logic that allows the neural network to produce intermediate values between the conventional discrete responses. For example, rather than a conventional neural network determining whether water is hot or cold, a neural network employing fuzzy logic to determine whether the water is warm. In this way, the machine includes a more human-like way of thinking. One of the primary advantages of fuzzy logic is that it allows expertise from experienced engineers to be folded into the computer's decision making process without requiring representation of this expertise to be in the form of a set of differential equations or other explicit mathematical expressions.

Although fuzzy logic allows the machine to behave in a manner more similar to a human, it does not completely allow the neural network to continue its learning process. Rather, it provides the neural network with the ability to refine its previous knowledge. In other words, the fuzzy logic may allow the neural network to control a system using broader parameters, but the neural network will still be fixed to operate within such parameters. Thus, similar to a neural network that does not include fuzzy logic, the learning process associated with the bottom-up approach to controlling a machine eventually becomes saturated.

As mentioned above, the bottom-up approach includes building electronic replicas of the human brain's complex network of neurons. However, as mentioned above, neural networks require a knowledge base that can be used as a training set of examples. That training set is based on monitoring a certain number of plant variables. Thus, the neural network is generally capable of only controlling a fixed number of variables, thereby preventing the addition or subtraction of plant variables to its neural network.

The other approach for creating machines to replicate human activity is the top-down approach, which attempts to replicate the brain's behavior with computer programs. A machine that utilizes this AI approach is often referred to as an expert system. A significant number of expert systems use event correlation techniques to control the plant. In other words, the control system detects certain events within the plant and correlates those events with similar occurrences and the corresponding results that are stored within the control system's knowledge base to determine how to respond to the latest event. As discussed in detail in U.S. Pat. No. 5,528,516, which is hereby incorporated by reference, there are generally five approaches to event correlation: (1) rule-based reasoning; (2) case-based reasoning; (3) reasoning with generic models; (4) probability networks; and (5) model-based reasoning.

Of those five event correlation approaches, rule-based reasoning appears to be the approach used most often. Rule-based reasoning generally contains two components: (i) a working memory which represents knowledge of the current state of the system being monitored; and (ii) a rule base which contains expert knowledge in the form of "if-then" or "condition-action" rules. The condition part of each rule determines whether the rule can be applied based on the current state of the working memory, and the action part of a rule contains a conclusion which can be drawn from the rule when the condition is satisfied.

Rule-based reasoning can be applied in either a forward chaining mode or a backward chaining mode, but the forward chaining mode currently appears to be used more regularly. In the forward chaining mode, the working memory is constantly scanned for facts that can be used to satisfy the condition part of each rule. When a condition is found, the rule is executed. Executing a rule means that the working memory is updated based on the conclusion contained in the rule. The newly updated data can thereafter be used to satisfy the conditions of other rules, resulting in a "chain reaction" of rule executions. Rule-based expert systems benefit from straightforward knowledge acquisition because the "if-then" format of the rules often mimics the format of expert knowledge. Furthermore, the knowledge base can be incrementally modified because rules can be added or modified easily.

However, there are several inherent limitations to a rule-based expert system. For example, such a system requires the knowledge base to have plant specific information that describes the design and operation of the particular plant. Thus, for systems about which such information is unavailable or uncertain, this approach is inadequate. Additionally, as the complexity of the plant and control system increases, a larger knowledge base is required. Performing "if-then" analysis to such a large knowledge base, in turn, significantly reduces the control system's response time.

As the complexity of the plants and processes increases, so does the number of variables (i.e., nodes) that are monitored, thereby increasing the sophistication of the computerized control system. In fact, as the number of nodes increases, the complexity of the control system may increase super-linearly (e.g., exponentially). Operating such a complicated control system, in turn, often reduces its response time.

Probability networks can be used in conjunction with rule-based expert systems. For example, a rule in the form "if A then B" can be augmented with a certainty factor: "if A then B with certainty 90%". Such a statement is an element of a probability network, and each element is considered a proposition. Additionally, probabilities can be assigned to the relationships between proposition. For example, "the truth of proposition A causes the truth of proposition B with probability 90%." When an event occurs, the probability of the proposition representing the occurrence of that event is updated to 100%, and this change is propagated to other propositions in the network based on the relationships. A hypothesis can then be generated by listing those propositions having the highest probabilities.

Although probability networks may be able to produce hypotheses with a precise confidence level, every proposition has a causal relationship with every other proposition. Thus, the number of connections in the probability network would be approximately equal to the square of the number of propositions in the network. Accordingly, the complexity of an event correlation algorithm using probability networks is typically high. As mentioned above, as the complexity of the plant increases, so does the number of monitored variables and its system's knowledge base. Furthermore, adding probability analysis to the expert system further increases the size of the system's knowledge base and reduces the control system's overall response time.

Controlling plants and processes via computer networks and systems is continuously increasing. As the size and complexity of the plants being controlled by such computer systems increase, what is needed is a real-time response control system. In other words what is needed is a control system that does not require a training set of examples or an existing knowledge base. What is needed is a control system that has an unsaturated and unsaturatable learning process that is not bound by the preexisting rules established by the knowledge base. Additionally, what is needed in a real-time control system that has the ability to add and subtract plant variables.

OBJECTS OF THE INVENTION

It is an object of the invention to create a control system that is able to learn without a training set of information.

It is another object of the invention to create a control system that has an unsaturatable learning process.

It is another object of the invention that the resulting control system be capable of learning and control of non linear dynamical systems.

It is further object of the invention to create a control system that is capable of adding additional observable variables or subtracting existing observable variables to determine the state of the plant.

SUMMARY OF THE INVENTION

In order to meet these and other objectives, the present invention contains elements of both the bottom-up and the top-down components. Bottom-up components arise from the need to learn and update from empirical feedback data. This bottom up component uses data obtained during the operation of the control process to develop a model of the control dynamics. This development is based on an empirical extension of the Euler-LaGrange method of modeling dynamical systems. As the control algorithm gains more experience, the empirical model approaches the theoretical (underlying) dynamical model. Advantages of the invention over neural nets arise from this extension. Specifically, though the neural nets have the ability to "learn" a model from data, this model is simply a fitted model from a family of nonlinear models constructed from the neural net paradigm. Though this neural net family is small, it is deemed to adequately represent most nonlinear data problems. However, the fitted model has not meaning relative to the physics of the problem. Consequently, aberrant data coming into a fitted model does not result in reasonable predictions or control actions. Adding new nodes or changing weights does not give predictable extensions of the model to a more general physical principle. The invention resolves both of these problems. The top-down component arises when expertise is input into the control mode. This expertise may be in the form of dynamical equations, forms of the constraints, prior statistical distributions, and/or modification of posterior and predictive distributions. Though the elicitation of expert information using fuzzy logic has classically been considered easier since such elicitation entails fuzzy terms, elicitation in developing prior distributions has recently seen rapid advances. Use of prior distributions and edits of posterior and predictive distributions from elicited data are more readily incorporated into the dynamical equations. Fuzzy logic attempts to avoid the explicit representation of the dynamical equations by using fuzzy constructs to approximate dynamical behavior in the plant. The advantage over fuzzy set methods is that the elicited expertise enters into the underlying physics of the plant model more explicitly. This permits model refinement, portability of subsets of the model and ease in the building an unsupervised model improvement strategy. The overriding advantage of the invention over the collective use of neural nets and fuzzy logic systems is that the invention will eventually learn the empirical physics of the plant from which a LaGrangian can be formed to describe the explicit plant dynamics. Neural nets and fuzzy logic, used separately or together cannot do this. The invention does not claim the development of LaGrangians from empirical representations as this is the subject covered in the current literature. The current invention provides a method of learning an intrinsic data model empirically and developing a dynamical plant model in the context of this empirical representation.

The present invention is a method of operating a plant and a control system for controlling the operation of the plant according to such method. The invention starts with the variables that provide the most information as measured by a convex representation of Shannon Information as a starting point. From this point, those variables that are the most informative are used to construct a partitioning of the data space. Plant dynamics are based learned behavior conditional on the partitioning. As more data is obtained, the partitioning is refined, systemically so that the partition includes more specific dynamical situations. The process proceeds similar to human processes. First a general pattern is determined and the finder details are observed and used only after general characteristics are identified.

The control system is able to continuously learn because the decisions made by the control system are based upon discrete estimated losses and probability between states. These estimated losses and probabilities are constantly updated, and revised loss is an average of all previous losses. Thus, the present invention has the ability to change with the dynamics of the plant. In other words, as the plant experiences different losses, those losses are included within the overall average, which itself is constantly changing.

The foregoing features and advantages of the present invention will become more apparent in light of the following detailed description of exemplary embodiments thereof as illustrated in the accompanying drawings.

BRIEF DESCRIPTION OF DRAWINGS

FIG. 4 is an example of a table having a finite number of state variables.

FIG. 6 is an example of an embodiment of a transitional loss and probability table.

DESCRIPTION OF THE PREFERRED
EMBODIMENTS

Hardware Overview

Figure 1:
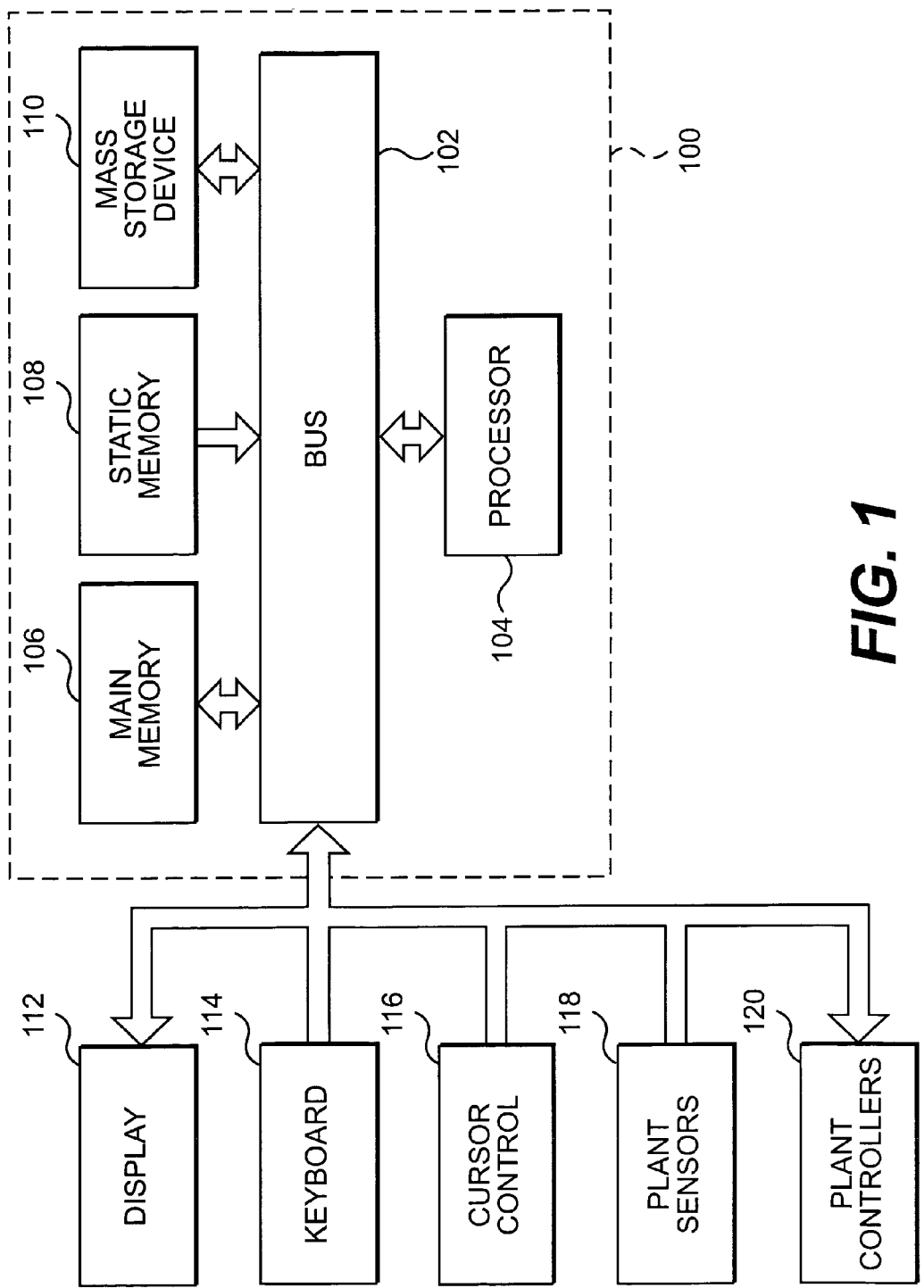
FIG. 1 is a high-level block diagram of a computer system upon which an embodiment of the present invention may be implemented.

Referring to FIG. 1, there is shown a block diagram of a computer system 100 upon which an embodiment of the present invention can be implemented. The computer system 100 comprises a bus 102 or other communication means for communicating information and a processor 104 coupled to the bus 102 for processing information, which is generally in the form of digital data. The computer system 100 further comprises a random access memory (RAM) and/or another dynamic storage device, which is typically referred to as a main memory 106. The main memory 106 is also coupled to the bus 102. The main memory 106 is used to store information data and program instructions to be executed by the processor 104. The main memory 106 may also be used for storing temporary variables or other intermediate information during execution by the processor 104.

The computer system 100 further comprises a read only memory (ROM) and/or another static storage device, which is typically referred to as a static memory 108. The static memory 108 stores static information and instructions for the processor 104. Furthermore, the computer system 100 may comprise a mass data storage device 110, such as a magnetic disk or optical disk and its corresponding disk drive for storing additional information and instructions. Similar to the other components within the computer system 100, the storage device 110 is coupled to the bus 102.

Input and output devices can also be coupled to the computer system 100 via the bus 102. For example, the computer system 100 may be connected to a display unit 112, such as a cathode ray tube (CRT) or a light emitting diode (LED) for displaying information to a computer user. The computer system 100 may also be connected to a keyboard 114 (or keypad), as well as a cursor control 116, such as mouse for inputting information to the computer.

Because the present invention is related to using a computer system 100 for controlling a plant, the computer system 100 will receive input data signals from multiple plant sensors 118 and produce output signals to at least one controller 120. According to one embodiment, controlling the plant in response to monitoring certain plant observable variables is performed by the computer system 100 in response to the processor 104 executing sequences of instructions contained in the main memory 106. Execution of the sequences of instructions contained in the main memory 106 causes the processor 104 to perform the process steps that will be described hereinafter. In an alternative embodiment, hard-wired circuitry may be used in place of or in combination with software instructions to implement the present invention. A further alternative embodiment may also include a stand alone controller that is capable of receiving the input date, performing the software instructions, and producing the necessary output signal(s). Thus, the present invention is not limited to any specific combination of hardware circuitry and software.

General Overveiw of Present Invention

There are two major phases of the control system of the present invention. The first is referred to as the initiation phase, and the second is referred to as the learning phase. The initiation phase relates to determining the context in which the input data (i.e., observable date) is presented to the learning phase. In other words, the initiation phase determines which data is passed along to the learning phase and the format in which it is passed along.

The initiation phase can be performed either in a supervised or unsupervised manner. A supervised manner requires human input. The human input can be in the form of a complete training set or knowledge base or as a supplement thereto or to the observed data. An unsupervised manner does not require the human input of data. Rather, an unsupervised initiation phase allows the computer system to independently determine the optimum data that will be used by the learning phase. As will be discussed in more detail below the initiation phase will select the optimum data using likelihood methods and present it to the learning phase in a parameterized form. Thus, in an unsupervised manner the computer system creates the entire training set or knowledge base, compared to a supervised manner wherein a human enters the data into the computer system via the keyboard or downloads it to the memory in the form of a database.

The learning phase relates to when the computer system receives the observable data and makes a decision based upon the observable data and in view of the existing knowledge base developed in the initiation phase. After the computer system makes its decision, an output signal is created and the estimate of the state of the plant is altered. The computer system determines the magnitude of the state change and compares that change to the target. Based upon the feedback process of producing an output signal, monitoring the effect of the change on the state of the plant, and comparing that state change to the targeted change, the computer system constantly adjusts its decision process, thereby learning the dynamics of the plant.

The ability to learn in an unsupervised manner is to function at a variety of levels. For example, initial learning may be totally unsupervised. In this case there is no training data or initial model put forth to start the process. On the other hand, expertise on the plant to control, in the form of dynamic equations, relevant measurements or implicit constraints may be available at the outset. In this case unsupervised learning begins with this knowledge and improves by learning more about the plant as feedback is obtained. Alternatively, some initial plant data may be available to approximate plant dynamics. Using this initial plant model as a starting point, unsupervised learning must enhance this model to develop a control strategy for the plant. Naturally the more initial information or supervision the algorithm receives the faster a viable control model emerges.

Both the initiation phase and the learning use feedback to learn and adjust. However, as noted above, the initiation phase can be based on data already collected. In this case the "feedback" is limited to the observations already taken. If the initiation phase consists entirely of expert opinion to get an initial model of the plant, then only the learning phase will be using feedback data.

Initiation Phase

Creating a Subset of the Most Informative Data Signals

Figure 2:
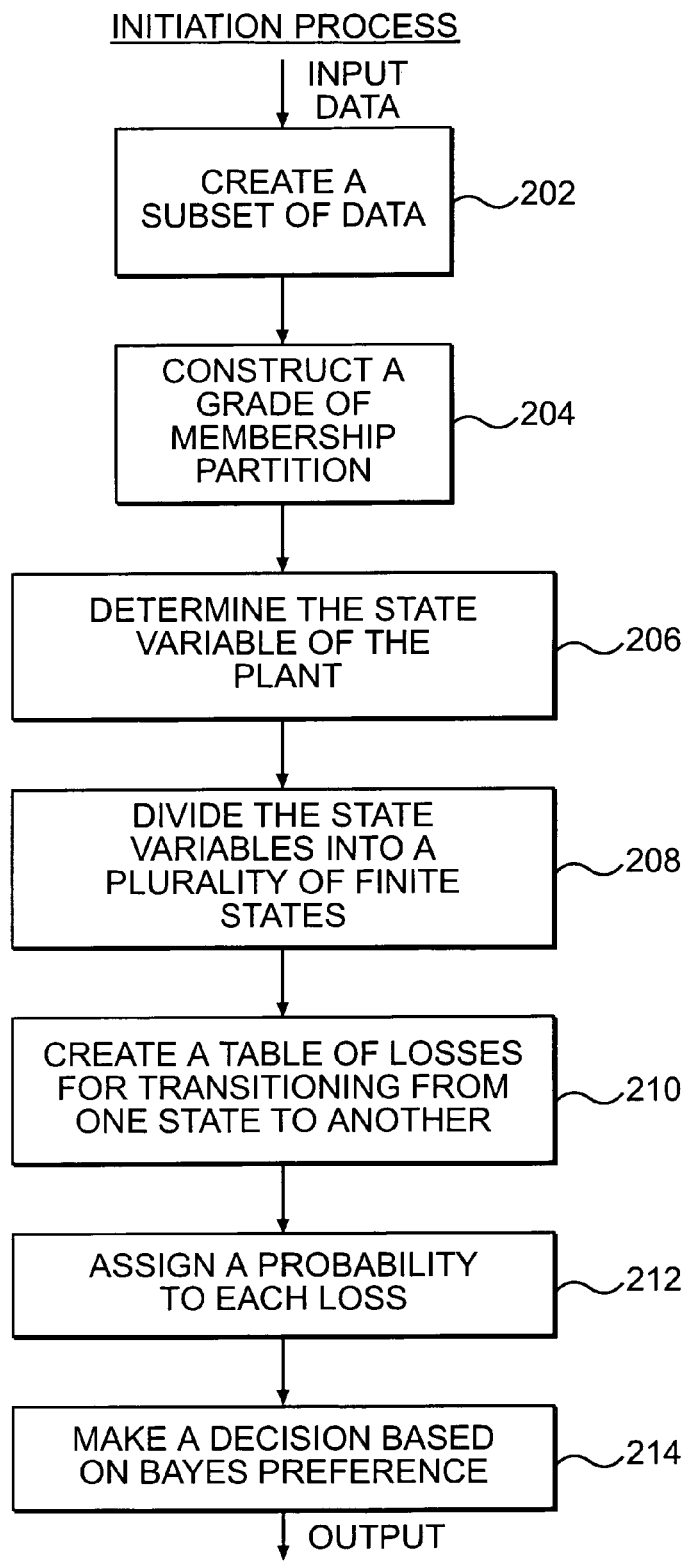
FIG. 2 is a high-level block diagram on embodiment of the initiation process of the present invention.
Figure 3:
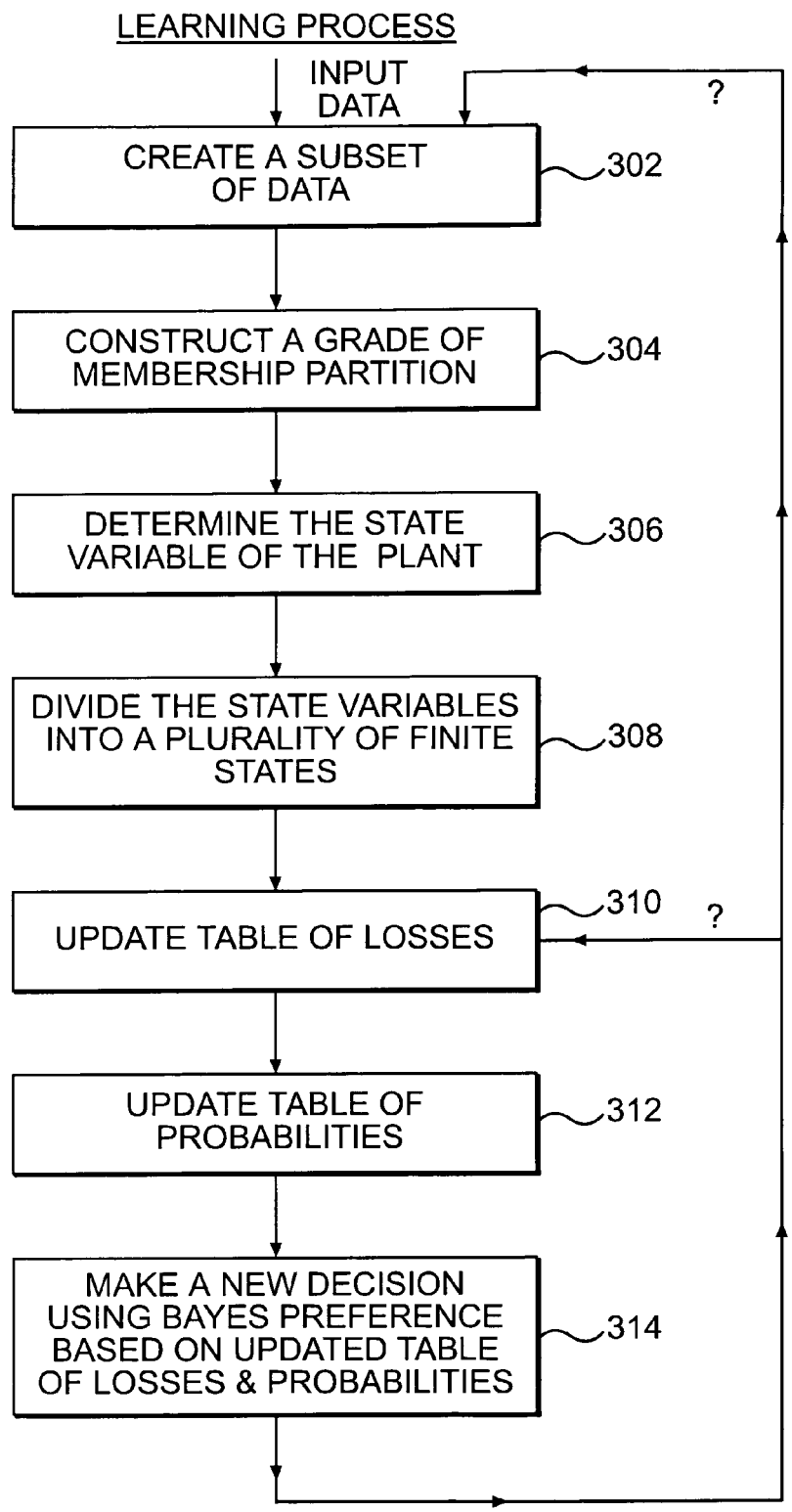
FIG. 3 is a high-level block diagram of an embodiment of the learning process of the present invention.
Figure 5:
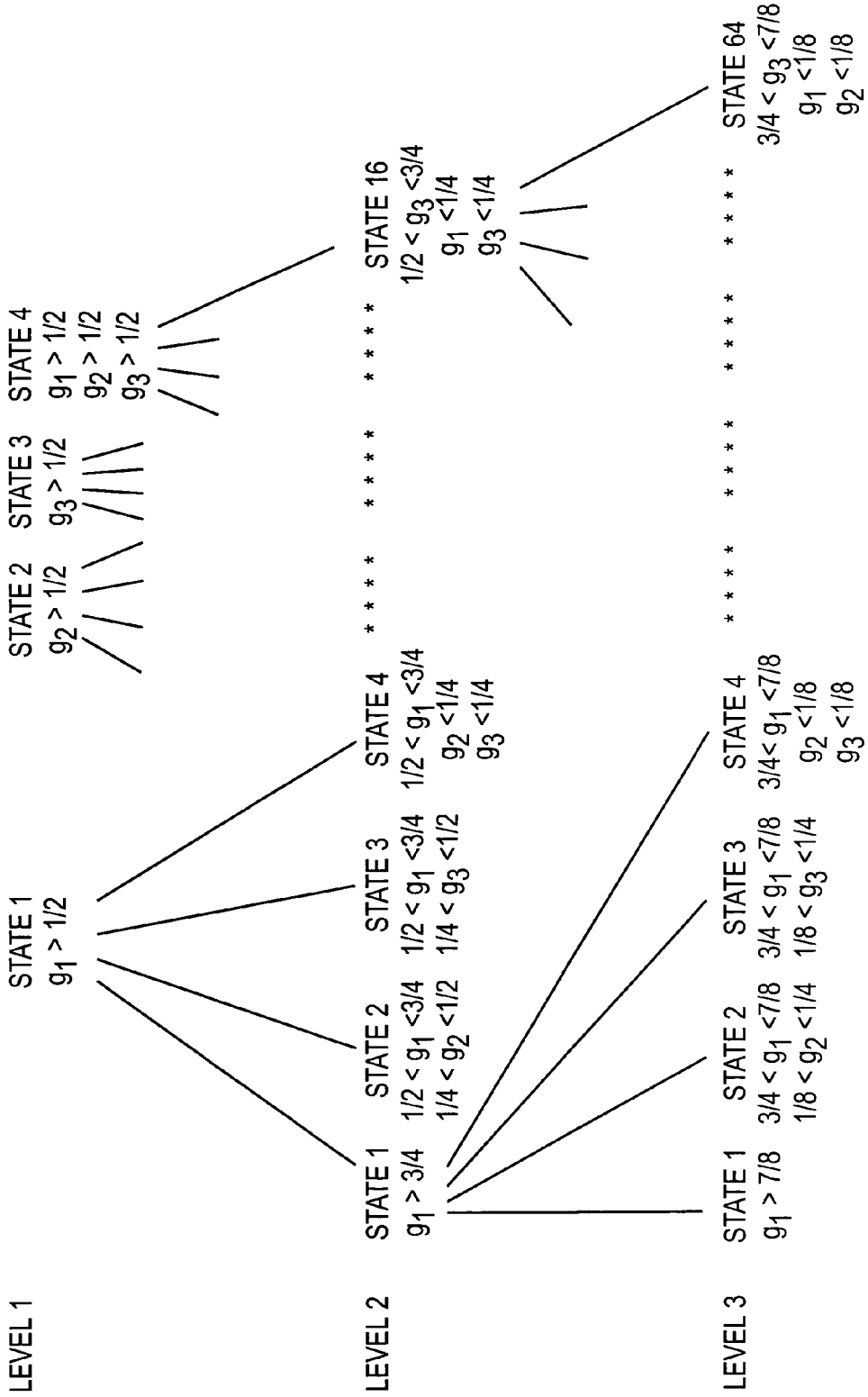
FIG. 5 is an example of a hierarchical chart of the state variables.

Assuming that the initiation phase is operating in an unsupervised manner, referring to FIG. 2, there is shown the six (6) general steps performed in the initiation phase: creating a subset of data; constructing a grade of partition membership; dividing the state variables into a plurality of finite states; creating a table of losses for transitioning from one state to another; assigning a probability to each loss; and making a decision using a Bayes preference.

The first step in the unsupervised initiation phase includes created a primary subset of data signals. As is known in the art, computerized control systems used to operate complex plants (i.e., systems) typically sense a plurality of observable variables within the plant with an equivalent number of sensors. Upon receiving a set of digital data signals, either directly from the corresponding plant sensors or after being converted from analog to digital signals by an A/D converter, the computer system 100 reduces the received set of data signals into a subset. The subset of data signals will be representative of those data signals that contain the maximum amount of relevant information upon which the control of the plant depends. Data reduction is important only when the number of variables is so large that determining which variables are the most informative is difficult. If there are only few variables, say two or three, then data reduction is unnecessary.

A method well known in the art for reducing a set of data signals is accomplished by determining the principal components of the covariance matrix of data. Using conventional statistical procedures, the covariance matrix of the data is formulated using the expected values of the difference between the squared values of the data and the mean, or the difference between the cross product values of the data and the mean.

The principal components specify several orthogonal axes of orientation of the data where the most "information" is obtained. As an example using conventional statistical procedures, the principal components are determined by factoring, say, a singular value decomposition of the covariance matrix. Under the assumption that the data is approximately normally distributed, the orthogonal axes correspond to rotations of the data that represent the data with independent variables. Principal components determine which of these independent variables represent the most variability in the observed data. Considering only data relevant to these axes is a data reduction step where the data retained explains the most variation in the data.

The data reduction step introduced by the invention differs from the singular value decomposition in that it chooses the axes of the data that captures the most information in the data. In this case, the amount of information is assessed based on the assumption that the data is discrete rather than continuous.

Consequently, the least squares type criterion is replaced with the maximum likelihood criterion. As is well known in the art, maximum likelihood estimation uses observed data more efficiently than least squares methods. When the data are discrete or continuous but deviate from a Gaussian distribution, the advantage of maximum likelihood over least squares methods is greater, i.e., maximum likelihood is a more efficient use of information. As a consequence, a set of factors, similar to axes, are identified as the most important pieces of information. These factors assign each set of convex scores to each combination of quantized inputs coming from the plant. These scores represent a tuple, i.e. a data object containing two or more components, giving a similarity of the particular combination to the pre-specified constraint groups. The similarity scores are then used to define discrete states of operation of the plant. The scores for subsequent quantized inputs are determined by modeling a functional relationship between the observed plant inputs and the resulting scores fitted by maximum likelihood methods. This is done using any applicable statistical procedure known in the art such as, but not limited to, logistic regression. In essence, this relationship is represented by a weight associated with each quantized plant input variable.

The method of the present invention takes a set of input data (categorical data) and determines the degree to which the observation represents each of the important factors identified. The weight is determined by using statistical estimation procedures, common in the art, that relate scores fitted by maximum likelihood to quantized plant inputs. The statistical procedures common in the art of use in establishing this relationship are logistic regression and loglinear modeling methods. These measures of degree of similarity are called "state variables" of the process. State variables differ from the observed variables in that observed variables consist of variables measured about the plant during operation or feedback measurements from actions taken by the plant. State variables are like state functions in chemistry and physics.

State variables may describe the operating condition of the plant or other machine or system having multiple operating variables. These are derived from the measurement variables as described above. Note that the control literature also refers to 'state' of a system. By this is meant the particular values of the plant variables whether or not they are directly measurable. This control definition of state is more restricted than the definition of state variables above. The control definition of state gives the instantaneous values of the relevant measurements. The state variables, as used here, define the dynamical state under which the plant is currently working. For simple linear dynamical systems, controlled say, by using a Kalman filter, there is only one state as determined by the state variables since the entire plant is represented by a single set of linear dynamical equations. When the plant is represented by a set of non-linear dynamical equations, the state variables will define several plant states, each or which can be approximated by a linear dynamical system. However, the measurements (the "states" in the control literature) that are input into these dynamics, as either observed directly or estimated by say, a Kalman filter, varies. By recognizing different values of the state variables with associated dynamics, the range of control is increased to include a wide variety of nonlinear systems. This has recently been recognized in the art, though an algorithm for systematic construction of a self-adaptive or AI controller has not come forth. The current invention includes an algorithm to estimate the state variables from the data or information provided in the initiation step. Estimates of these state variables can be improved in the learning steps as the plant operates and provides feedback.

Whereas the singular value methods reduce data based on variability, relevant mainly with observations that are decimal type numbers, the invention reduces the data according to information content. When the data are discrete, such as counts, qualitative variables, or quantized decimal variables, basing the data reduction on information results in a reduced set of variables that are nearly independent and contain the most information for partitioning.

When the data is continuous (for example, decimal type number), both singular methods and cluster analysis methods currently known in the art may be used to define clusters. These clusters are then used to define discrete states by quantizing (recoding continuous measurements into discrete ranges identifying these clusters). The importance of this step is that initially the amount of data is limited relative to the various plant models that might be fit. By defining discrete ranges for the observations and using the partitioning algorithm of the invention, a great deal of noise and aberrant variation is reduced and only highly informative discrete variable states are identified. Less data is required to fit a control strategy conditional on these states than in the original data set. Current art does not perform this information based state definition but rather makes assumptions about the plant to fit a model. These assumptions limit the flexibility in controlling the plant. They are also difficult to implement when plant dynamics vary significantly from linearity. In these cases current art requires manual identification of regions where the plant may behave in a linear manner and boundaries where the plant dynamics must be modified to approximate nonlinear behavior. The invention resolves this problem by beginning at a coarse level of partitioning and gradually refining this partitioning as new data is obtained. Since the coarse partitioning is based on the most informative variables, the invention efficiently defines the coarse partitioning and then systemically refines this as informative feedback is received.

Reducing a set of data signals into a subset creates a primary classification of observable variables into a set of dynamical states as defined by the state variables. These dynamical states are constructed to maximize the difference between dynamical states as measured by a type of information. This is done by choosing the discrete variables that jointly maximize the information as defined below. Explicitly, by assumption, each random variable takes on only a finite number of values.

To define the information (referred to as Shannon information), define a partition of the potential outcomes into M different discrete states. A partition breaks up the set of possible conditions into a set of non-overlapping subsets. These subsets are to be referred to as dynamical states. The purpose of the partition is to provide control for nonlinear plants by constructing and adapting linear control methods for each of the dynamical states and then learn (or adapt) a control process for the smaller dynamical states. In this the more data that is obtained, the more capable the algorithm will be to learn any nonlinear plant. This partition can be defined according to some preferred partitioning outcome, such as the classification of an outcome, decision, or action, or it may be defined using all (or a subset of) the possible outcomes from the J variate random variables $Y_i$. For any set of variables $j_1, j_2, \ldots, j_K$, let $p(m|j_1, j_2, \ldots, j_K)$ denote the probability of an observation being in class m of the partition given the values $Y_{i,j1}, Y_{i,j2}, \ldots, Y_{i,jK}$ and let $p(m|j_1, j_2, \ldots, j_K)$ denote the joint probability of being in class "m" of the partition and the values of $Y_{i,j1}, Y_{i,j2}, \ldots, Y_{i,jK}$. Let $p(m)$ be the marginal probability of an occurrence in the class m of the partition. As is well known in the art, the Shannon information for this set of variables is $$I(m; j_1, j_2, \ldots, j_K) = \Sigma\Sigma p(m, j_1, j_2, \ldots, j_K)$$
$$\log[p(m|j_1, j_2, \ldots, j_K)/p(m)] \quad \text{Eq. 1}$$

where the logarithm is base e, and where the first sum is over all M classes of the partition and the second is over all possible values of the random variables $Y_{i,j1}, Y_{i,j2}, \ldots, Y_{i,jK}$. For any fixed integer K<J, the set of random variables $Y_{i,j1}, Y_{i,j2}, \ldots, Y_{i,jK}$ which maximizes $I(m; j_1, j_2, \ldots, j_k)$ as defined in Equation 1 are used as the primary classification variables. This measure of information gives an index of how informative knowledge of the various values of j are relative to the probability of the outcome m. If knowing the various levels of j greatly changes, increases or decreases, the probability of the outcome m over other values of j then the index I will be larger. If knowledge of the levels of j provide little or no change in the probability of m, then j values provides little or no information. Though Shannon's work dates back to the 1940's, Boltzmann posited a concept of entropy/information in the late $19^{th}$ century. The well-known equation 1 is presented here, as it is the starting point for constructing a partitioning into dynamical states.

Determining the Dynamical States

Preliminaries.

Dynamical states are determined first assuming that the plant can be in one of a finite number of microstates. This assumption is consistent with the statistical mechanics model where, due to the assumption individual particles can be in one of a finite number of discrete energy states. Since each system or plant is made up of a collection of individual particles the system plant can be in only one of a finite, though large, number of states. These are referred to here as micro-states. The particular micro-state of the plant is assumed to specify plant dynamics and, consequently, be the key to control of the plant.

Values of measurements taken on the plant will also be specified by the micro-state, up to stochastic error. As described previously, measurements are assumed to be discrete, or are quantized into a finite number of discrete values according to some range of values. The notation for these measurements is given as follows:

j=index for discrete measurement variables. We assume there are J variables measured on each individual. Thus j=1, . . . , J.

l=index for level of response for a measurement j, l= 1, . . . , $L_j$.

i=index for individuals i=1, . . . , n.

$Y_{ij}$=a random variable taking a value of 1 if the measurement on variable j has a response level of 1 for individual i.

$x_{ijl}$=1 if the realization of $Y_{jl}$ is 1.

0 otherwise.

$P_{ijl}$=probability individual i has response l to measurement j.

The micro-states completely determine the probability of response to all measurements. Let $S_1$ denote the index set for the micro-states. The probabilities for the micro-state satisfy some set of overall constraints. The common example in statistical mechanics is the set of probabilities assigned such that the total energy over all the states is fixed or fixed in expectation. Alternatively for an economic system, the economic activity of all agents combined is fixed.

Based on these measurements we wish to model the probabilities of being in each micro-state given a set of measurements. Determination of these probabilities will necessitate a probability model. As the intent of the invention is to "learn" the probability model from the data, the probability model is built on only the assumptions relating known constraints. The probabilities for each state are determined to be those for which the overall entropy is maximized, subject to the fixed constraints. In scientific models, entropy arises from basic driving forces such as chemical potential. In general data modeling maximizing entropy corresponds to the minimum constraints on the underlying probability model. Each of these is now formally described.

A. States

As known in the art, if a joint probability model exists for the J measurements, $Y_{ij}$, j=1, . . . , J, then there exists a discrete, finite state random variable, denoted Z, such that given Z, the measurements on each individual are independent. The random variable Z is referred to as a common cause random variable. Denote the set of values of Z as $S_2$. The set of states we will use is that generated by the Cartesian product $S_1 \times S_2$. We call this set of states "fine states." Elements of this finite set will be indexed by s, s=1, . . . , S. By construction, conditional upon the fine state of an individual, the probabilities of response are completely specified and the probabilities for different measurements on the same individual are independent.

B. Prior Information

Some information may be available about the micro-states or $p_{ijl}$ in addition to the constraint that probabilities sum to unity. Expertise from individuals or analysis of previous data from the plant may be available. This information will provide some grouping of dynamical behavior. We call these groups of states on which some prior information is available "course states." These course states are loosely formed collections of the micro-states. That is, the course states may only contain an (unknown) proportion of the elements in a fine state.

The coarse states are only a means whereby prior information in the form of expertise or analysis of a previous data set is incorporated. If no prior information of any kind is available, then the coarse grouping will be generated by the data as the algorithm learns in an unsupervised manner. In this case, initially there is only one coarse state.

To incorporate the prior information through coarse states define the following:

k=index of coarse groups, k=1, . . . , K.

$E_{kjl}$=proportion of measured variable j, level l, contributed by coarse group k. Often there are constraints on $E_{kjl}$ such as observations follow a Gaussian or other probability distribution across levels of l, represented for each k, j combination as $G_{kj}(l)$, and/or observations follow, say, a linear model across values of j for each value of k, represented by $R_k(j)$. General constraints for $E_{kjl}$ are thus assumed to be of the form:

$E_{kjl}$=$B_k$ $R_k(j)$ $G_{kj}(l)$.

$g_{sk}$=proportion of elements in micro-state s that contribute to activity, $E_{kjl}$, in coarse state k.

$s_{kjl}$=Lagrange multiplier $\mu_{sj}$=Lagrange multiplier h(E)=joint prior distribution on $E_{kjl}$, k=1, . . . , K, j=1, . . . , J, and l=1, . . . , $L_j$.

Using this notation, the prior information is given in the form $$\sum_s p_{sjl} g_{sk} = E_{kjl} \quad (1)$$

Implicitly the $g_{sk}$ have been assumed to be non-negative, convex weights. Formally this is stated as Assumption 1: $g_{sk}$ are real numbers satisfying $$\sum_k g_{sk} = 1 \quad (2)$$

for all s, and $$g_{sk} \geq 0 \quad (3)$$

for all k and s.

Assumption 2: The $g_{sk}$, k=1, . . . , K, uniquely identifies the state s.

C. The Maximum Entropy Model

Specifying a model changes the level of uncertainty that the modeler allows in the analysis. Models that allow very little uncertainty limit the degree to which the data can speak for itself. Such models, in essence, represent information implicitly added to the problem by the modeler. Therefore, consistent with the goal of the invention, a model is specified that allows the most uncertainty and yet satisfies the three previous assumptions. Choosing a model thus requires first some measure of uncertainty. Known analysis techniques include an index of uncertainty that meets these requirements and has minimal assumptions. This index resembles entropy used in statistical mechanics, denoted as H, and defined in our notation as $$H = -\sum_s \sum_j \sum_l p_{sjl} \ln p_{sjl} \quad (4)$$

for given $E_{kjl}$.

The mathematical form of the probabilities of the micro-states is that distribution which maximizes H subject to the constraints given by equations (1), (2), and (3). Any other mathematical model of the probabilities would either maximize no index of uncertainty or maximize an index with additional constraints. In the second case the set of differing constraints usually entails additional constraints, meaning more user imposed information.

The Model

Maximization of H given in (4), subject to (1), (2), and (3) is accomplished by using Lagrange multipliers. In this case, differentiating the resulting equation with respect to each $P_{s_o j_o l_o}$ and setting to zero gives a system of equations of the following form:

$$\frac{\partial}{\partial p_{s_o j_o l_o}} \left[ \sum_s \sum_j \sum_l p_{sjl} \ln p_{sjl} + \sum_s \sum_j \mu_{sj} \left( \sum_l p_{sjl} - 1 \right) \right] = \sum_k \sum_l \sum_j \lambda_{kjl} \left( \sum_s g_{sk} p_{sjl} - E_{kjl} \right) = 0 \quad (5)$$

Differentiating and solving we get $$p_{s_o j_o l_o} = \exp\left( \mu_{s_o j_o} - 1 + \sum_k g_{s_o k} \lambda_{k j_o l_o} \right) \quad (6)$$

Note that this is for a fixed set of $E_{jkl}$. These $Ek_{kjl}$ are implicitly in the expression for $P_{s_o j_o l_o}$ of equation (6) since the $p_{sjl}$ and the $g_{sk}$ satisfy equation (1). We weight this expression by multiplying by the marginal h(E)

$$p_{s_o j_o l_o} = h(E) \exp\left( \mu_{s_o j_o} - 1 + \sum_k g_{s_o k} \lambda_{k j_o l_o} \right) \quad (7)$$

The unconditional $P_{s_o j_o l_o}$ can be determined by integrating out the E in equation (7). Conditional on the $g_{sk}$, the probabilities for each measurement are stochastically independent. Therefore, the overall likelihood is given by $$L = h(E) \prod_i \prod_j \prod_l \exp(\mu_{ij} - 1 + \sum g_{ik} \lambda_{kjl})^{x_{ijl}} \quad (8)$$

where we have substituted individual particle i for state s. In maximizing equation (8) note that the constraints on $E_{kjl}$ are specified by $R_k(j)$ and $G_{kj}(l)$.

Dynamical states are formed from estimated values of $g_{ik}$. To do this define the following vectors of length K:

$$g_i = (g_{i1}, g_{i2}, \ldots, g_{iK})$$

$$\lambda_{jl}^T = (\lambda_{1jl}, \lambda_{2jl}, \ldots, \lambda_{Kjl})$$

The expression in the exponent of equation (8) may be written as $$\Sigma g_{ik} \cdot \lambda_{kjl} = g_i \lambda_{jl}$$

However, if A is any real, non-singular K×K matrix with unit eigen values, and inverse $A^{-1}$, the entry in the exponent may also be written as $$\Sigma g_{ik} \cdot \lambda_{kjl} = g_i A A^{-1} \lambda_{jl}. \quad (9)$$

The set of $g_{ik}$ values that can be generated by the set of all such matrices, A, is called a coset of the equivalence relation defined by A. The matrix A* which produces the $g_{ik}$ values with the greatest plant predictability and control stability is used to define the dynamical groups.

The invention includes the linear approximation given by $$p_{s_o j_o l_o} = \frac{\sum \lambda_{k j_o l_o} g_{sk}}{W_{kj}} \quad (10)$$

Here $$W_{kj} = \sum_1 \lambda_{kjl}$$

is used to standardize the $P_{s_o j_o l_o}$ to sum to unity. Note that the $\lambda_{kjl}$ by construction of the Lagrange method. In this approximation there is also a coset constructed by a set of nonsingular, unit eigenvalue matrices. The $g_{ik}$ values associated with the greatest predictability of the plant and greatest stability of the control strategy is used to define the dynamical states. The likelihood given by Equation 8 or its linear approximation are solved by iterative methods known in the art.

The second application of Equation 8 is in classification as new data is encountered. This is used in the learning mode of the algorithm. The first step in the learning algorithm entails classification of each individual observation as it is encountered into one of a finite number of states based on the available data. This classification into one of a finite number of states is based on $g_{ik}$s estimated from the presenting data. In this case, $\lambda_{kjl}$ is fixed at the value estimated in the first application. The $g_{ik}$ is estimated by choosing values that maximize Equation 8 with respect to the $g_{ik}$s given the individual specific data $Y_i$. Note that this is done for each individual independently.

Divide the State Variables Into a Plurality of Finite States

As discussed above, the step of Creating a Subset of the Most Informative Data Signals determines the degree to which the observable variables represent each of the important variables. Those degrees or similarities, which can be referred to as scores ($g_{ik}$), are called "state variables." In order to estimate more accurately the state of the plant, the state variables are quantized into a number of finite states. In other words, the decimal values are grouped into discrete ranges and then a single number is used to represent every value in that range. The number of finite states is determined by dividing the region of possible $g_{ik}$ scores into equal sub-regions. Since those scores are values between zero and unity, each region can be represented as a power of ½. For example, $(½)^2=0.25$; $(½)^3=0.125$; $(½)^4=0.0625$; etc. The finite states of order M are those states in which $g_{ik}$ scores agree in the representation up to the $M^{th}$ power of ½. The number of dynamical states is the number of groups in which the ranges have been divided for example, 4, 8, 16, etc. It is not the number of times the state variables are the same for each power of ½.

This quantization step entails a type of rounding off. Rounding off means that all state variables with values in the range of each particular dynamical state will be considered to have the same value. This value is not set to be the boundary value such as 0.25, 0.125 or 0.0625. Once grouped into a dynamical state, the actual values of the state variables are not important, only the identification of the dynamical state to which they belong. This is because given the dynamical state, the dynamical equations and targeting strategies for optimization (see below) are specified. Changing the state variable to another value but not enough to place it into another dynamical state have no effect. As the dynamical states become more finely defined, the collection of state variables ending up in the same dynamical state will tend to be almost equal values.

The hierarchy of states refers to the sets of dynamical states that are defined as the whole process is refined through increased number of observations. Each of the dynamical states at one level were parts of larger states in previous refinements. For example, if the initial number of dynamical states is 4, and more data is gathered, each of these states may be split in half, so that 8 smaller dynamical states are produced. This would be the second tier in the hierarchy.

Selecting the appropriate level of hierarchy is done in one of two manners. First it can be done by expert input, indicating that the definition of dynamical states with proceed only so far and then be fixed. Alternatively, it can be done empirically, in which case a dynamical state is split only when the amount of feedback for the state has been sufficient to estimate the parameters of the state. Depending on the dynamical model associated with the state, this may be from 50 to 500 observed feedbacks from the dynamical state.

Assigning a Loss for Transitioning from One State to Another

For each level of the hierarchy, a table of losses (and predicted probabilities, which is discussed in further detail below) can be constructed. Specifically, transitioning from one dynamical state to another results in some degree of loss. A negative loss is a gain. Loss is based upon the criteria selected for controlling the plant. For example, a criterion well known in the art, entails assigning a loss for each input associated with the cost of the action resulting from the input and the amount the resulting status of plant deviates from a pre-specified target. Both of these loss components are usually represented as integrals (or sums in discrete time) of quadratic expressions of cost and of deviation from target. The plant status, referred to in the art as the state, is not be confused with the dynamical state defined previously. The form of the loss function may be based on the dynamical state, but the loss criterion is based only on the state of the plant, the control target, and the cost of the action prescribed by the controller.

Initially, a value of the loss is assigned. Assignment of the loss is based upon available empirical data or expert evidence. The initial loss can be in the form of a training set of data or an existing knowledge base of information or it can be entered manually by a computer user.

When no information on loss is available, a naive loss, such an equal loss for each action will be assumed. The loss criterion is then updated as learning processing is begun. In case the loss is based on the quadratic expression common in the art, an expression of the 'noise' variation is the usual basis for the loss. This may be available from previous data or expert opinion. If not, an approximate variation is estimated from initial data.

Assigning a Transition Probability

After the loss is determined, a probability is assigned to each loss. In the initial component, the transition probabilities for transitioning from state to state are determined similarly to the initial losses. Specifically, transitional probability values are either selected from prior empirical evidence or they are elicited from an expert. Transition probabilities are the probabilities that the plant will move from one dynamical state to another in a unit of time given the control action. The invention allows for any manner of expression for these transition probabilities. Control actions, common in the art, are based on optimal control derived from solving a Riccati equation based on the plant dynamics. The invention constructs a Riccati equation based on the plant dynamics. The invention constructs a Riccati equation for each dynamical state when the quadratic loss for each dynamical state is used. In this case the invention does not require an initial specification of transition probabilities but can estimate these from the data, based on the dynamical state.

Making a Decision by Calculating the Optimal Action

After determining the appropriate level of the hierarchy, the amount of loss for that hierarchy and the corresponding transition probability, the computer system makes a decision to alter the state of the plant in a particular manner. The decision is made using a Bayes preference, which means that the decision is selected that will result in the smallest loss, on average. The computer system, therefore, produces an output signal to the plant to adjust a variable a certain amount. The state in which the computer system wishes to change the plant to is considered the target. The invention introduces a new adaptive method for selecting the target using the dynamical states. Current art uses the desired endpoint as the target. The invention estimates a target reduction factor based on the desired endpoint and the dynamical state. Based on a fractional factorial design with complex confounding as is known in the art, optimal target reduction factors for each state are estimated using models containing primarily main effects and two factor interactions. Optimal target reduction factor will minimize expected loss for each dynamical state.

Learning Phase

Updating the Initial Loss Table

After the adjustment is made using the Bayes preference, the resulting (i.e., actual) outcome and loss are fed back to the computer system so that the computer system may learn from its previous action. Specifically, the decision making process discussed above calculates the expected loss to be a particular value assuming a certain action was taken. After the action is taken, the actual loss is observed. If the actual loss is different than the predicted loss, the loss table that was previously used to calculate the expected loss is adjusted up or down to make the next estimated loss more consistent with the most recent action. The adjustment made to the loss table is a compromise between the previous tabulated losses and the most recently observed loss. In other words, the subsequent estimated losses will be a function of the weighted average of all previous losses and the initial losses. A more detailed description of how the initial losses are updated is as follows.

The loss from one state to another is expressed using the variable X. Thus, the loss from state "s" to state "u" is expressed as $X_{su}$. Accordingly, the average of all losses across state "s" is expressed as follows:

$$\overline{X}_s = \frac{\sum_{u=1}^{ni} X_{su}}{n_s}$$

where, $n_s$=the number of observations in state s.

Based upon the definition of $\overline{X}_s$, the average of all losses across all states is expressed as $\overline{X}$ and according to the following formula:

$$\overline{X} = \frac{\sum_{i=1}^{S} \sum_{u=1}^{ni} X_{su}}{\sum_{s=1}^{S} n_s}$$

$$\text{Mean square Error}(MSE) = \sum_{s=1}^{S} \left( \frac{\sum_{u=1}^{n_i} (X_{su} - \overline{X}_s)^2}{\sum_{s=1}^{S} (n_s - 1)} \right)$$

$$\text{Mean square}(MS) = \frac{\sum_{i=1}^{S} n_i (\overline{X}_i - \overline{X})}{S-1}$$

Note that the average for each state is modified each time there is an observation in the state. The variable $n_s$ indexes the number of observations to date in state "s."

As mentioned above, adjustments made to the loss table are a compromise between the previous tabulated losses and the most recently observed loss. Thus, a compromise factor "Z", is defined as follows:

$$Z = \frac{MS - MSE}{MS + \left(\frac{n_o}{n_j} - 1\right) MSE} \quad (11)$$

where, $$n_0 = \left( \sum_{s=1}^{S} n_s - \frac{\sum_{s=1}^{S} n_s^2}{\sum_{s=1}^{S} n_s} \right) / (S-1)$$

Assuming that the initial estimate of the loss is denoted as H, then the updated estimate for the loss for state "s" is determined according to the following formula:

$$C_s = Z\overline{X}_s + (1-Z)H \quad (12)$$

Updating the Probability Tables

As discussed above, the initial probabilities are entered empirically. After the computer system begins to collect plant data, it can update the probability tables. One method of updating the probability tables is derived from a Bayes preference model giving a formula known in the statistical art as:

$$\overset{*}{P}_{rs} = \frac{\alpha P_{rs} + m_{r,s}}{\alpha + m_{r+}} \quad (13)$$

where $P_{rs}$ is the initial transition probability from state "r" to state "s", $m_{r+}$ is the number of times that the process has been in state "r", $m_{rs}$ is the number of times that the transition from state "r" to state "s" is observed, and $\alpha$ is the learning rate, a dimensionless parameter. Ranges of values will have to be input through particular experience.

Furthermore, the initial losses for higher level of the hierarchical states will be determined as the marginal losses of the parent state in the hierarchy.

The methods of the present invention, as described and illustrated with respect to the embodiments herein, are conventionally carried out in software running in conventional computer systems. These computer systems are further designed to apply the control methods described to such plants as are disclosed in the embodiments described herein. Other systems may be used to execute the methods of the present invention, including conventional integrated circuits, chipsets, programmable controllers, and other electronic or mechanical devices capable of processing computer software or instructions comprising the methods of the present invention. Furthermore, the software need not be located at a single point in the plant or system being controlled, but may be integrated in whole or in part into multiple components of the plant or system being controlled. Furthermore, as those skilled in the art will recognize, the plant described herein as an embodiment applying the control methods of the present invention can be any mechanism, machine or system having multiple operating variables. Examples of such alternative embodiments may include complex machinery such as metal stamping, milling or forming equipment, chemical processing equipment, numerous applications for controlling biological systems, and sophisticated transportation systems. In connection with biological systems, a harvestable product generally refers to a product biologically grown and harvested for consumption or related processing such as for example corn, soybeans, wheat, hay grass, tomatoes, berries, potatoes, carrots or other fruits and vegetables.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A method of controlling a plant having a controller which continuously responds to feedback control signals, comprising the steps of:

(a) receiving a set of data signals from plant sensors indicative of a plurality of observable plant variables;

(b) creating a combination of data signals from said set of data signals during operation of the plant using said controller;

(c) constructing a partition from said subset of data signals using said controller and repeatedly refining the partition based on said data signals;

(d) determining state variables of the plant using said controller during operation of the plant and the controller;

(e) dividing said state variables into a plurality of finite states based upon feedback control signals and said data signals received by said controller;

(f) estimating losses associated with transitions of the plant from one state to plurality of possible other states using said controller;

(g) continuously updating probabilities associated with said losses based on said state variables, said feedback control signals and said data signals using said controller;

(h) identifying optimal decisions using said controller to determine a first set of input control signals and applying said first set of input control signals to said plant and to said controller as updated feedback control signals, wherein said determination of the first set of input control signals is based upon said losses and probabilities;

(i) continuously receiving an updated set of data signals from said plant sensors;

(j) continuously updating said estimated losses using said controller and said updated set of data signals;

(k) continuously updating said probabilities associated with said losses using said updated set of data signals; and (l) using a Bayes preference with said controller to determine subsequent sets of input control signals and applying said set subsequent sets of input control signals to said plant and to said controller, wherein said new determination is based upon said updated losses and probabilities.

2. The method of claim 1, wherein the step of updating said estimated loss comprises estimating a subsequent loss that is a marginal value of said previously estimated loss.

3. The method of claim 2, wherein the step of updating said estimated losses is a function of the average of all previous losses.

4. The method of claim 2, wherein the step of updating said estimated losses is a function of an interpolation of all previous losses.

5. The method of claim 2, wherein the step of updating said estimated losses is a function of an extrapolation of all previous losses.

6. The method of claim 1, wherein said plant processes harvestable products.

7. The method of claim 1, wherein said plant operates transportation equipment.

8. The method of claim 1, wherein said plant operates a chemical process.

9. A method of controlling a machine having a controller which continuously responds to feedback control signals, comprising the steps of:

(a) receiving a set of data signals from sensors indicative of a plurality of observable machine variables;

(b) creating a combination of data signals from said set of data signals during operation of the machine using said controller;

(c) constructing a partition from said subset of data signals using said controller and repeatedly refining the partition based on said data signals;

(d) determining state variables of the machine using said controller during operation of the machine and the controller;

(e) dividing said state variables into a plurality of finite states based upon feedback control signals and said data signals received by said controller;

(f) estimating losses associated with transitions of the plant from one state to a plurality of possible other suites using said controller;

(g) continuously updating probabilities associated with said losses based on said state variables, said feedback control signals and said data signals using said controller;

(h) identifying optimal decisions using said controller to determine a first set of input control signals and applying said first set of input control signals to said machine and to said controller as updated feedback control signals, wherein said determination of the first set of input control signals is based upon said losses and probabilities;

(i) continuously receiving an updated set of data signals from said machine sensors;

(j) continuously updating said estimated losses using said controller and said updated set of data signals;

(k) continuously updating said probabilities associated with said losses using said updated set of data signals; and (l) using a Bayes preference with said controller to determine subsequent sets of input control signals and applying said subsequent sets of input control signals to said machine and to said controller, wherein said new determination is based upon said updated losses and probabilities.

10. The method of claim 9, wherein the step of updating said estimated loss comprises estimating a subsequent loss that is a marginal value of said previously estimated loss.

11. The method of claim 10, wherein the step of updating said subsequent loss is a function of the average of all previous losses.

12. The method of claim 10, wherein the step of updating said subsequent loss is a function of an interpolation of all previous losses.

13. The method of claim 10, wherein the step of updating said subsequent loss is a function of an extrapolation of all previous losses.

14. An apparatus for controlling a plant that continuously responds to feedback control signals, comprising:

(a) means for receiving a set of data signals from sensors indicative of at least one of a plurality of observable variables;

(b) means for creating a combination of data signals from said set of data signals during operation of the plant;

(c) means for constructing a partition from said subset of data signals and for repeatedly refining the partition based on said data signals;

(d) means for determining state variables of the system during operation of the plant;

(e) means for dividing said state variables into a plurality of finite states based upon feedback control signals and said data signals;

(f) means for estimating losses associated with transitions of the plant from a first state to a plurality of possible other states;

(g) means for continuously updating probabilities associated with said losses;

(h) means for identifying optimal decisions to determine a first set of input control signals and for applying said first set of input control signals to said plant, wherein said determination of the first set of input control signals is based upon said losses and probabilities;

(i) means for continuously receiving an updated set of data signals from the sensors;

(j) means for continuously updating said table of losses using said updated set of data signals;

(k) means for continuously updating said probabilities associated with said losses using said updated set of data signals; and (l) means for determining subsequent sets of input control signals using, a Bayes preference and for applying said subsequent sets of control signals to said plant, wherein said determination is based upon said updated losses and probabilities.

15. The apparatus of claim 14, wherein said plant is a biosystem.

16. The apparatus of claim 14, wherein said plant is a transportation system.

17. The apparatus of claim 16, wherein said updating said subsequent loss is a function of the average of all previous losses.

18. The apparatus of claim 16, wherein said updating said subsequent loss is a function of an interpolation of all previous losses.

19. The apparatus of claim 16, wherein said updating said subsequent loss is a function of an extrapolation of all previous losses.

20. The apparatus of claim 14, wherein said means for updating said estimated loss comprises means for estimating a subsequent loss that is a marginal value of said previously estimated loss.

21. An apparatus for controlling a machine that continuously responds to feedback control signals, comprising:

a control system including a processing system and including a memory coupled to the processing system, wherein the control system is configured to:

(a) construct a partition from said subset of data signals and repeatedly refine the partition based on said data signals;

(b) determine state variables of the machine during operation of the machine;

(c) divide said state variables into a plurality of finite states based upon feedback control signals and said data signals;

(d) estimate losses associated with transitions of the plant from one state to a plurality of possible other states;

(e) continuously update probabilities associated with said losses based on said state variables, said feedback control signals and said data signals;

(f) identify optimal decisions to determine a first set of input control signals and applying said first set of input control signals to said machine as feedback control signals, wherein said determination of the first set of input control signals is based upon said losses and probabilities;

(g) continuously receive an updated set of data signals from said machine sensors;

(h) continuously update said estimated losses using said updated set of data signals;

(i) continuously update said probabilities associated with said losses using said updated set of data signals; and (j) use a Bayes preference to determine subsequent sets of input control signals and applying said subsequent sets of input control signals to said machine, wherein said new determination is based upon said updated losses and probabilities.

* * * * *